ELECTROMAGNETICALLY ACTUATED OPTICAL SIGNALLING DEVICE

Filed Nov. 5, 1962

Inventors
B. DAL BIANCO
M. SCATA
By Paul W. Hemminger
Attorney

United States Patent Office 3,178,703

Patented Apr. 13, 1965

3,178,703

ELECTROMAGNETICALLY ACTUATED OPTICAL SIGNALLING DEVICE

Bruno Dal Bianco and Mario Scata, Milan, Italy, assignors to International Standard Electric Corporation, New York, N.Y., a corporation of Delaware

Filed Nov. 5, 1962, Ser. No. 235,249
Claims priority, application Italy, Nov. 7, 1961, 17,705/61, Patent 662,090
1 Claim. (Cl. 340—373)

This invention relates in general to an optical signalling device and in particular to a two-position indicator such as those used in telephone switchboards to indicate to the telephone operator, the condition of a subscriber line. Its principal object is to provide a new and improved signalling device of the above character which is compact in size, reliable in operation with a minimum of power consumption and economical to manufacture.

Prior-art signalling devices are known in which an indicator is moved between two positions in response to energization and de-energization of an associated electromagnet. These devices have the disadvantage that a large armature movement is required to move the indicator a sufficient distance to permit easy detection of position variations and thus these known devices require high-power windings. When the sensitivity of these armatures is increased to permit lower power requirements, they become subject to stray magnetic fields and often are operated erroneously.

It is an object of the present invention to provide an optical signalling device having an indicator which is used in conjunction with the armature of an electromagnet and which has a greater travel distance than the travel distance of the associated armature.

It is another object of the present invention to provide an optical signalling device which is sensitive yet relatively non-responsive to stray magnetic fields.

It is still another object to provide a two-position optical signalling device of the above character which has a minimum of mechanical parts.

The above-mentioned objects and features of the invention will become apparent and the invention will be best understood when the specification is read in conjunction with the accompanying drawings comprising FIGS. 1 to 4 in which.

Figures 1, 2, 3:
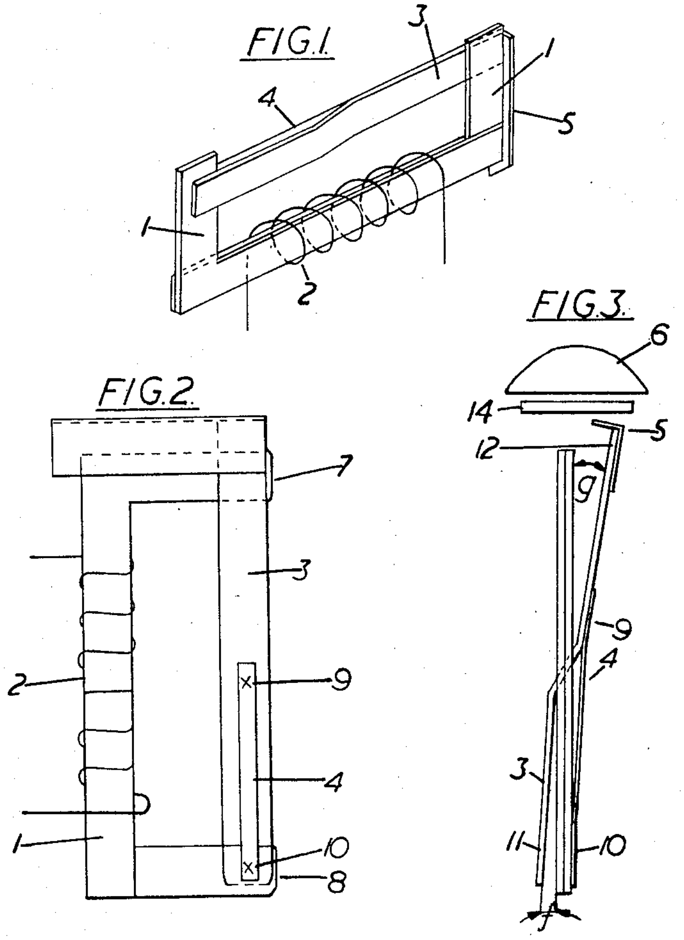
FIG. 1 shows an enlarged perspective view of the optical signalling device of the invention.
FIG. 2 shows a side view of the device of FIG. 1.
FIG. 3 shows a top view of the device of FIG. 1.
Figure 4:
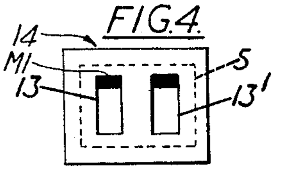
FIG. 4 illustrates the front portion of the optical signalling device of FIG. 1 showing the viewing openings of the optical signalling device.

Referring now to the drawings, the optical signalling device comprises a somewhat C-shaped magnetic core 1, flux generating means in the form of an energizing coil 2, a movable armature 3 made of magnetic material, a movable pivot means in the form of a flat light spring 4 which is an armature fulcrum, an optical leaf or indicator flag 5, and a lens 6. As best shown in FIG. 2, magnetic core 1 is an elongated structure having two salient pole pieces 7, and 8 positioned at 90° with respect to the straight portion of the core on which the energizing coil 2 is wound. An armature 3, comprising a rectangular bar of magnetic material is formed in an S-shaped configuration and it is supported (at point 9) near its center of gravity by the thin flat spring 4, rigidly secured (at point 10) to the end of pole piece 8 of the magnetic core 1 in such a way that the end 11 of the armature is positioned a short distance from pole piece 8 and the other end 12 of the armature is positioned a greater distance from its associated pole piece 7. An indicator 5 is welded or secured on the external side of end 12 of the armature at 90° with respect to the longitudinal axis thereof. Characteristic marks (such as those shown at M1) are placed on indicator 5 for observation by an observer through openings 13 and 13' which are shown in FIG. 4. These openings appear in an escutcheon 14 which is positioned between indicator 5 and lens 6, both of which are found near the end of the electromechanical assembly.

To use the lowest operating power possible for the operation of the optical device of the present invention, there has been used an arrangement which will be better understood from the following description.

As soon as the current flows in coil 2 (FIG. 2) the end face 11 of armature 3 (FIG. 3) is attracted to pole piece 8, because the end face 11 is at a distance "*f*" which is within flux-linking distance with the pole piece 8. The distance "*f*" is shorter than the distance "*g*" existing between pole piece 7 and face 12 at the other end of armature 3. For example, the distance "*g*" may be twice as long as the distance "*f*." Pole piece 7, being simultaneously weakly flux-linked to armature end 12, helps the attractive action. As soon as the end face 11 moves toward pole piece 8 it causes a movement of the pivot means to permit the other armature end 12 to move toward and associate with pole piece 7, slightly loading spring 4. With end face 12 now near pole piece 7, magnetic attraction therebetween causes armature end 12 to contact pole piece 7 overcoming airgap "*g*" and further loading flat spring 4. Under such conditions the optical display indicator 5 will be subjected to a displacement practically double the maximum airgap between the armature and pole piece which has been determined as a result of the attractive magnetic force generated with the set ampere turns of the energizing coil. Therefore, the power required for the operation of the present signalling device is correspondingly low.

When the energizing current through coil 2 ceases, flat spring 4, due to its elasticity, will return armature 3 and indicator 5 to their normal position.

To enhance the viewing of indicator 5, a magnifying lense 6 is secured in any suitable manner (not shown) on the front portion of the optical signalling device.

While the principles of the present invention have been described above in connection with a particular embodiment, it is to be clearly understood that this description is made only by way of example and not as a limitation to the scope of the invention.

We claim:

An electromagnetic-optical signalling device comprising:

a C-shaped magnetic core including a straight portion and first and second pole pieces at right angles to first and second ends of the straight portion;

a coil wound on the straight portion of said core to magnetize the core, in response to current, and to form an electromagnetic field passing through said first and second pole pieces;

a flexible leaf spring having a first end and a second end;

said first end of said flexible leaf spring being rigidly secured to the first pole piece in a manner permitting said second end to extend to a position substantially half-way between the first and second pole pieces;

an armature substantially equal in length to the straight portion of the magnetic core, shaped like a flattened S, and having a first and a second end;

said armature being firmly secured near its midpoint to the second end of said flexible leaf spring in a manner such that a first space between the first end of said armature and the first pole piece is substantially one-half as great as a second space between the second end of said armature and the second pole piece;

said first space being preselected to permit sufficient magnetic linkage between the pole and the armature, when the coil is energized, to cause the armature to deflect and to cause the first end of the armature to contact the face of the first pole piece;

said second space being preselected to be about twice as great as the first space to cause magnetic linkage between the pole and the armature to be insufficient to produce motion when the coil is first energized;

said second space being reduced by deflection through a distance substantially equal to said first space when said armature and leaf spring are deflected by magnetic action through said first space;

said second space, upon being reduced to be substantially one-half its original value, closing the gap for the magnetic field through the second magnetic pole and said armature to permit closure of said second space;

an indicator flag carried by the second end of said armature;

an escutcheon having an opening therethrough and positioned adjacent to the second end of said armature; and a lens positioned beyond said escutcheon;

said indicator flag, said escutcheon and said lens being aligned to permit the indicator flag to be visible through the lens and the opening in the escutcheon.

References Cited by the Examiner

UNITED STATES PATENTS

| | | | |
|---|---|---|---|
| 1,222,159 | 4/17 | Suwa | 317—197 X |
| 1,763,008 | 6/30 | Priessman | 317—198 |
| 2,359,546 | 10/44 | Carroll | 179—92 |
| 2,393,901 | 1/46 | Haigh et al. | 340—376 X |
| 2,510,157 | 6/50 | Towner et al. | 317—165 X |
| 2,975,341 | 3/61 | Schuessler et al. | 317—197 X |

FOREIGN PATENTS

| | | |
|---|---|---|
| 513,502 | 10/39 | Great Britain. |

E. JAMES SAX, *Primary Examiner.*

JOHN P. WILDMAN, *Examiner.*